United States Patent
Ryu et al.

(10) Patent No.: US 11,751,282 B2
(45) Date of Patent: Sep. 5, 2023

(54) ACTIVATING SIDELINK RELAY MAC-CE

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Jelena Damnjanovic, Del Mar, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 94 days.

(21) Appl. No.: 17/379,342

(22) Filed: Jul. 19, 2021

(65) Prior Publication Data
US 2022/0039200 A1    Feb. 3, 2022

Related U.S. Application Data

(60) Provisional application No. 63/059,503, filed on Jul. 31, 2020.

(51) Int. Cl.
*H04W 72/04*    (2023.01)
*H04W 80/02*    (2009.01)
(Continued)

(52) U.S. Cl.
CPC .......... *H04W 80/02* (2013.01); *H04L 1/1819* (2013.01); *H04L 1/1896* (2013.01); *H04W 92/18* (2013.01)

(58) Field of Classification Search
CPC .... H04W 80/02; H04W 92/18; H04L 1/1819; H04L 1/1896; H04L 2001/0097; H04L 1/1854
See application file for complete search history.

(56) References Cited

U.S. PATENT DOCUMENTS

2011/0269490 A1 * 11/2011 Earnshaw ............. H04L 5/0053
455/509
2016/0156548 A1 * 6/2016 Pazhyannur ...... H04W 28/0231
370/338
(Continued)

FOREIGN PATENT DOCUMENTS

EP          3512276 A1     7/2019
EP          3589023 A1     1/2020
WO       2019143900 A1     7/2019

OTHER PUBLICATIONS

International Search Report and Written Opinion—PCT/US2021/042362—ISA/EPO—dated Nov. 12, 2021.

*Primary Examiner* — Mahbubul Bar Chowdhury
(74) *Attorney, Agent, or Firm* — Procopio, Cory, Hargreaves & Savitch LLP

(57) ABSTRACT

The apparatus of wireless communication may be a UE configured to activate a MAC-CE transmitted over an SL relay after waiting a time period by receiving an activation request for a command in association with a third UE in a first MAC-CE relayed from a second UE, transmitting, to the second UE, a second MAC-CE including an activation response to the third UE in response to the activation request, and activating the command after transmitting the activation response. The UE may wait a time period after transmitting the activation response before activating the command. The UE may receive an HARQ ACK from the third UE in response to the transmitted activation response or an HARQ ACK from the second UE in response to the transmitted activation response, and wait a time period after receiving the HARQ ACK before activating the command.

27 Claims, 12 Drawing Sheets

(51) Int. Cl.
  *H04L 1/1867*    (2023.01)
  *H04L 1/1812*    (2023.01)
  *H04W 92/18*    (2009.01)

(56)      References Cited

U.S. PATENT DOCUMENTS

| | | | |
|---|---|---|---|
| 2016/0270071 A1* | 9/2016 | Dinan | H04L 1/1854 |
| 2018/0069618 A1* | 3/2018 | Loehr | H04W 72/1263 |
| 2019/0334669 A1* | 10/2019 | Akkarakaran | H04L 1/1607 |
| 2020/0029353 A1* | 1/2020 | Xu | H04W 52/0209 |
| 2021/0099916 A1* | 4/2021 | Dong | H04W 80/02 |
| 2021/0274545 A1* | 9/2021 | Adjakple | H04W 28/0268 |
| 2022/0338127 A1* | 10/2022 | Gao | H04W 52/146 |
| 2022/0346118 A1* | 10/2022 | Wu | H04L 1/08 |

\* cited by examiner

ACTIVATING SIDELINK RELAY MAC-CE

CROSS-REFERENCE TO RELATED APPLICATION(S)

This application claims the benefit of U.S. Provisional Application Ser. No. 63/059,503, entitled "METHOD AND APPARATUS FOR ACTIVATING SIDELINK RELAY MAC-CE" and filed on Jul. 31, 2020, which is expressly incorporated by reference herein in its entirety.

TECHNICAL FIELD

The present disclosure relates generally to communication systems, and more particularly, to a method and apparatus for activating a media access control (MAC) control element (CE) (MAC-CE) transmitted over a sidelink relay after waiting an activation time period.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. Some aspects of wireless communication may comprise direct communication between devices based on sidelink. There exists a need for further improvements in sidelink technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspect of the disclosure, a method, a computer-readable medium, and an apparatus are provided. The apparatus of wireless communication may include a user equipment (UE) configured to activate a MAC-CE transmitted over an SL relay after waiting a time period by receiving an activation request for a command in association with a third UE, the activation request being received in a first MAC-CE relayed from a second UE, transmitting, to the second UE and in response to the activation request, a second MAC-CE including an activation response to the third UE, and activating the command after transmitting the activation response. In one example, the UE may be further configured to receive a hybrid automatic request (HARQ) acknowledgment (ACK) in association with the third UE from the second UE in response to the transmitted activation response, wait a time period after receiving the HARQ ACK in association with the third UE and before activating the command, and determine the time period to wait after receiving the HARQ ACK in association with the third UE and before activating the command. In one example, the UE may receive the HARQ ACK in association with the second UE from the second UE in response to the transmitted activation response, wait a time period after receiving the HARQ ACK in association with the second UE and before activating the command, and determine the time period to wait after receiving the HARQ ACK in association with the second UE and before activating the command. In one example, the UE may wait a time period after transmission of the second MAC-CE including the activation response before activating the command, determine the time period to wait after the transmission of the second MAC-CE including the activation response and before activating the command based on a number of hops between the third UE and the first UE through which the activation request traveled, the number of hops being greater than or equal to one, and receive an HARQ ACK in association with the third UE from the second UE in response to the transmitted activation response. Here, the command may be activated either before or after receiving the HARQ ACK. Here, the activation request is received through a physical sidelink shared channel (PSSCH), and the activation response is transmitted through the PSSCH. The UE may include an ACK in the activation response.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
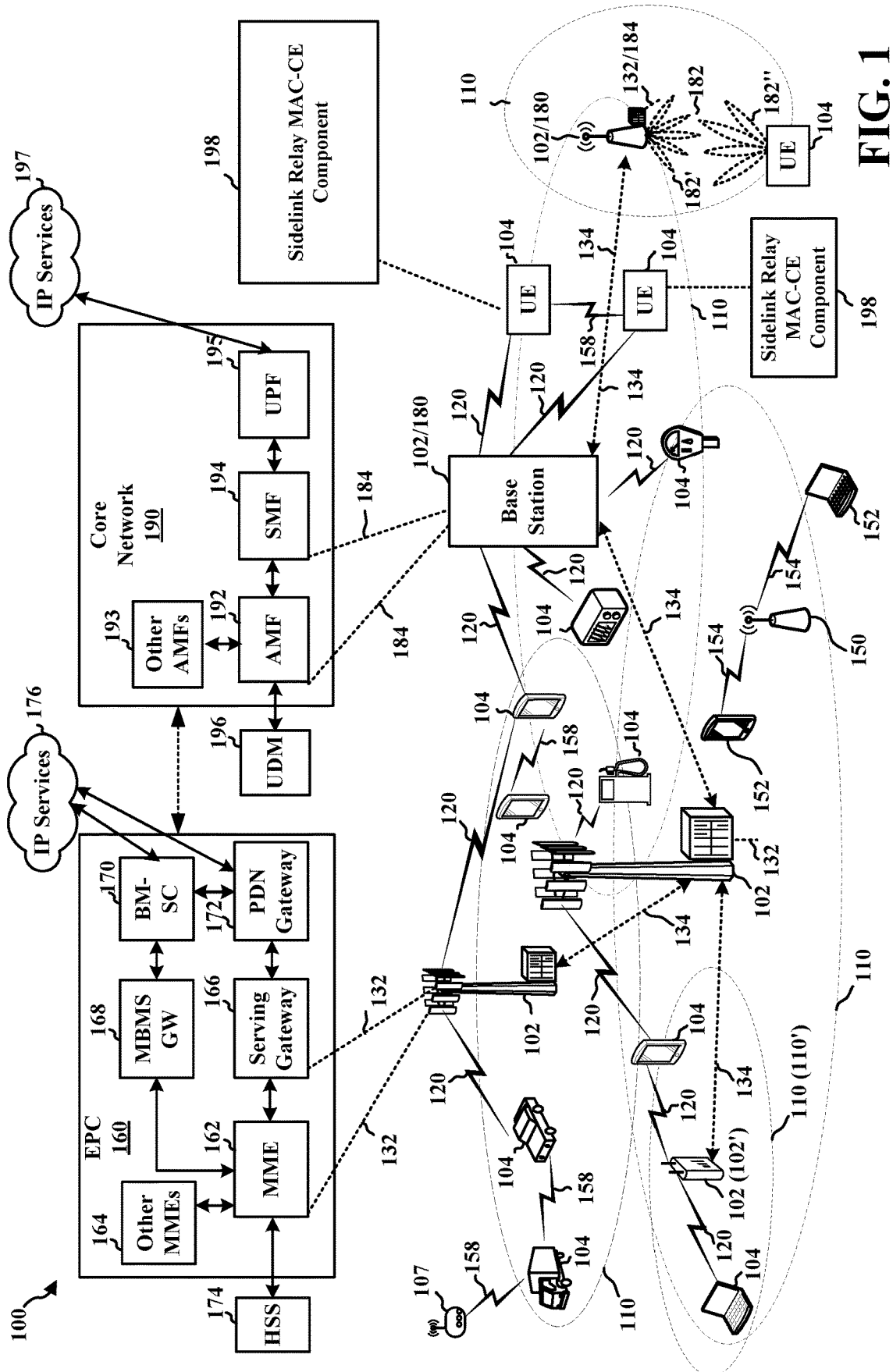
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

A link between a UE 104 and a base station 102 or 180 may be established as an access link, e.g., using a Uu interface. Other communication may be exchanged between wireless devices based on sidelink. For example, some UEs 104 may communicate with each other directly using a device-to-device (D2D) communication link 158. In some examples, the D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as abase station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 2, may provide examples for sidelink communication in connection with 5G NR, the concepts described herein may be applicable to other similar areas, such as LTE, LTE-A, CDMA, GSM, and other wireless technologies.

Referring again to FIG. 1, in certain aspects, a UE 104, or other device communicating based on sidelink, may include a sidelink relay MAC-CE component 198 configured to receive an activation request for a command in association with a third UE, the activation request being received in a first MAC-CE relayed from a second UE, transmit, to the second UE and in response to the activation request, a second MAC-CE including an activation response to the third UE, and activate the command after transmitting the activation response.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming. Similarly, beamforming may be applied for sidelink communication, e.g., between UEs.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same. Although this example is described for the base station 180 and UE 104, the aspects may be similarly applied between a first and second device (e.g., a first and second UE) for sidelink communication.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figures 2A, 2B, 2C, 2D:
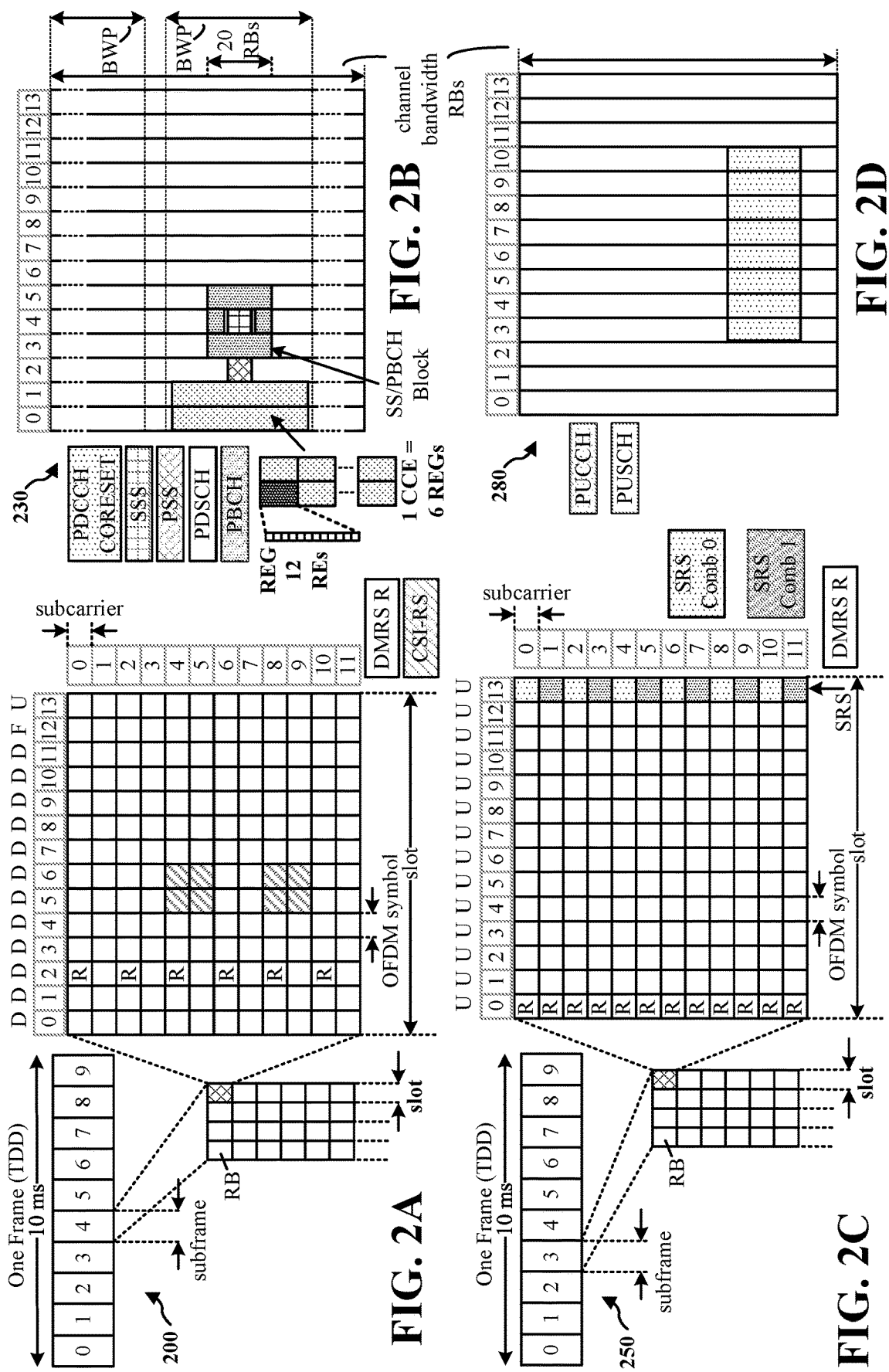
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
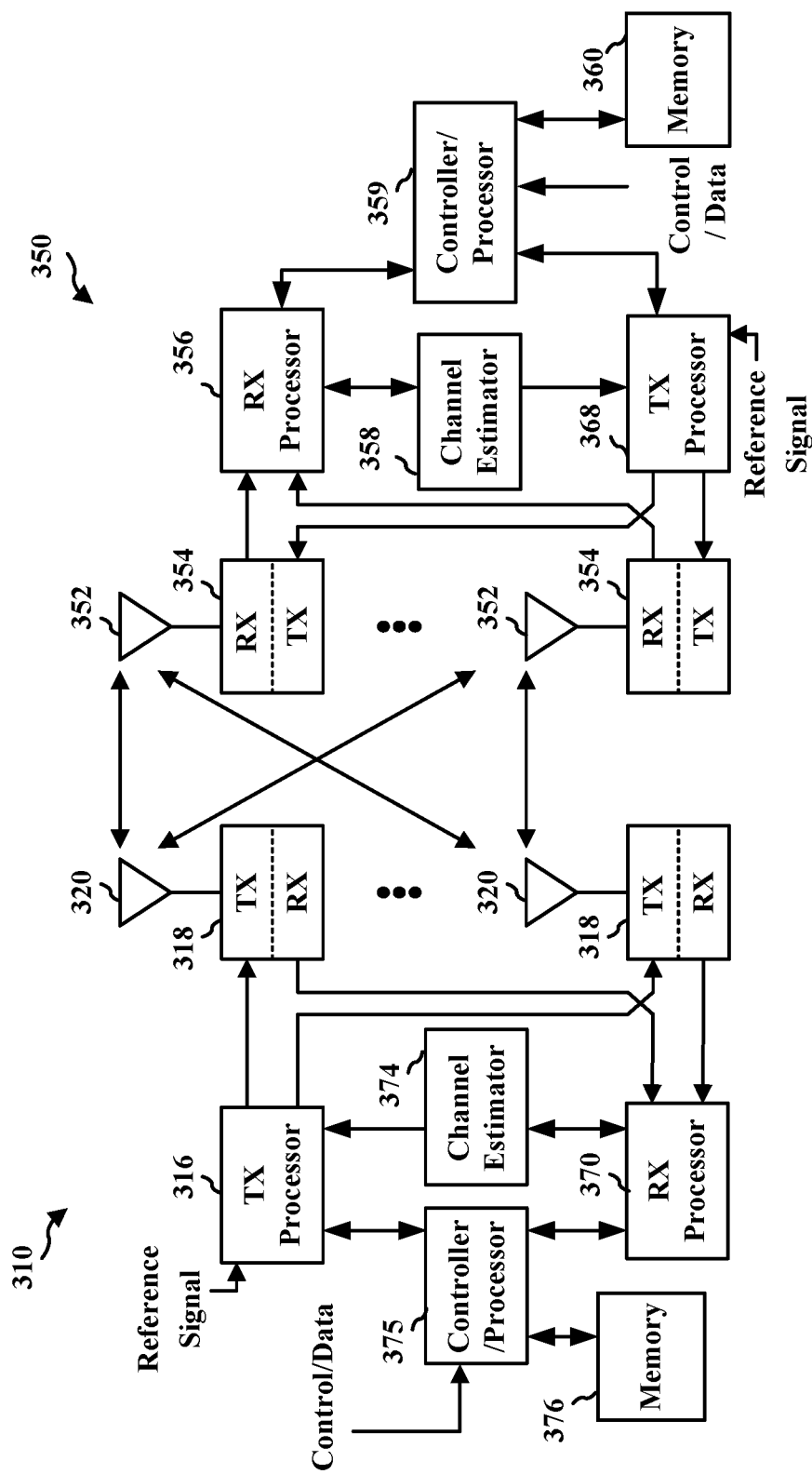
FIG. 3 is a diagram illustrating an example of a base station and user equipment (UE) in an access network.

FIG. 3 is a block diagram 300 of a first wireless communication device 310 in communication with a second wireless communication device 350 based on sidelink. In some examples, the devices 310 and 350 may communicate based on V2X or other D2D communication. The communication may be based on sidelink using a PC5 interface. The devices 310 and the 350 may comprise a UE, an RSU, a base station, etc. Packets may be provided to a controller/processor 375 that implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the device 350. Each spatial stream may then be provided to a different antenna 320 via a separate transmitter 318TX. Each transmitter 318TX may modulate an RF carrier with a respective spatial stream for transmission.

At the device 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the device 350. If multiple spatial streams are destined for the device 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by device 310. These soft decisions may be based on channel estimates computed by the channel estimator 358. The soft decisions are then decoded and deinterleaved to recover the data and control signals that were originally transmitted by device 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. The controller/processor 359 may provide demultiplexing between transport and logical channels, packet reassembly, deciphering, header decompression, and control signal processing. The controller/processor 359 is also responsible for error detection using an ACK and/or NACK protocol to support HARQ operations.

Similar to the functionality described in connection with the transmission by device 310, the controller/processor 359 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by device 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The transmission is processed at the device 310 in a manner similar to that described in connection with the receiver function at the device 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. The controller/processor 375 provides demultiplexing between transport and logical channels, packet reassembly, deciphering, header decompression, control signal processing. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 198 of FIG. 1.

Figure 4:
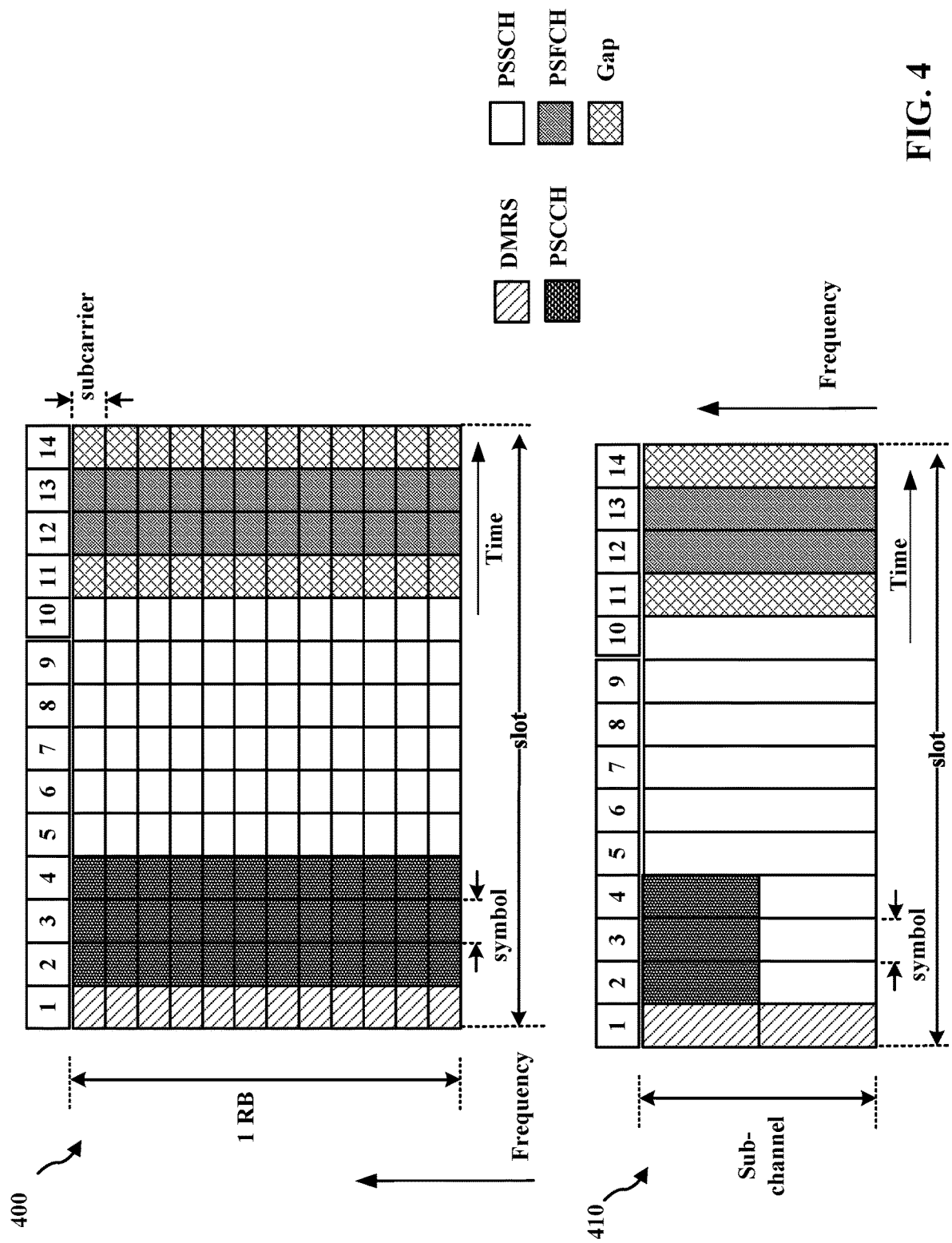
FIG. 4 illustrates example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 4 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 40, or 45 PRBs. The PSCCH may be limited to a single sub-channel. A PSCCH duration may be configured to be 4 symbols or 3 symbols, for example. A sub-channel may include 10, 15, 40, 45, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 4 symbols or 3 symbols. The diagram 410 in FIG. 4 illustrates an example in which the PSCCH occupies about 50% of a subchannel, as one example to illustrate the concept of PSCCH occupying a portion of a subchannel. The PSSCH occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in a PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Figure 5:
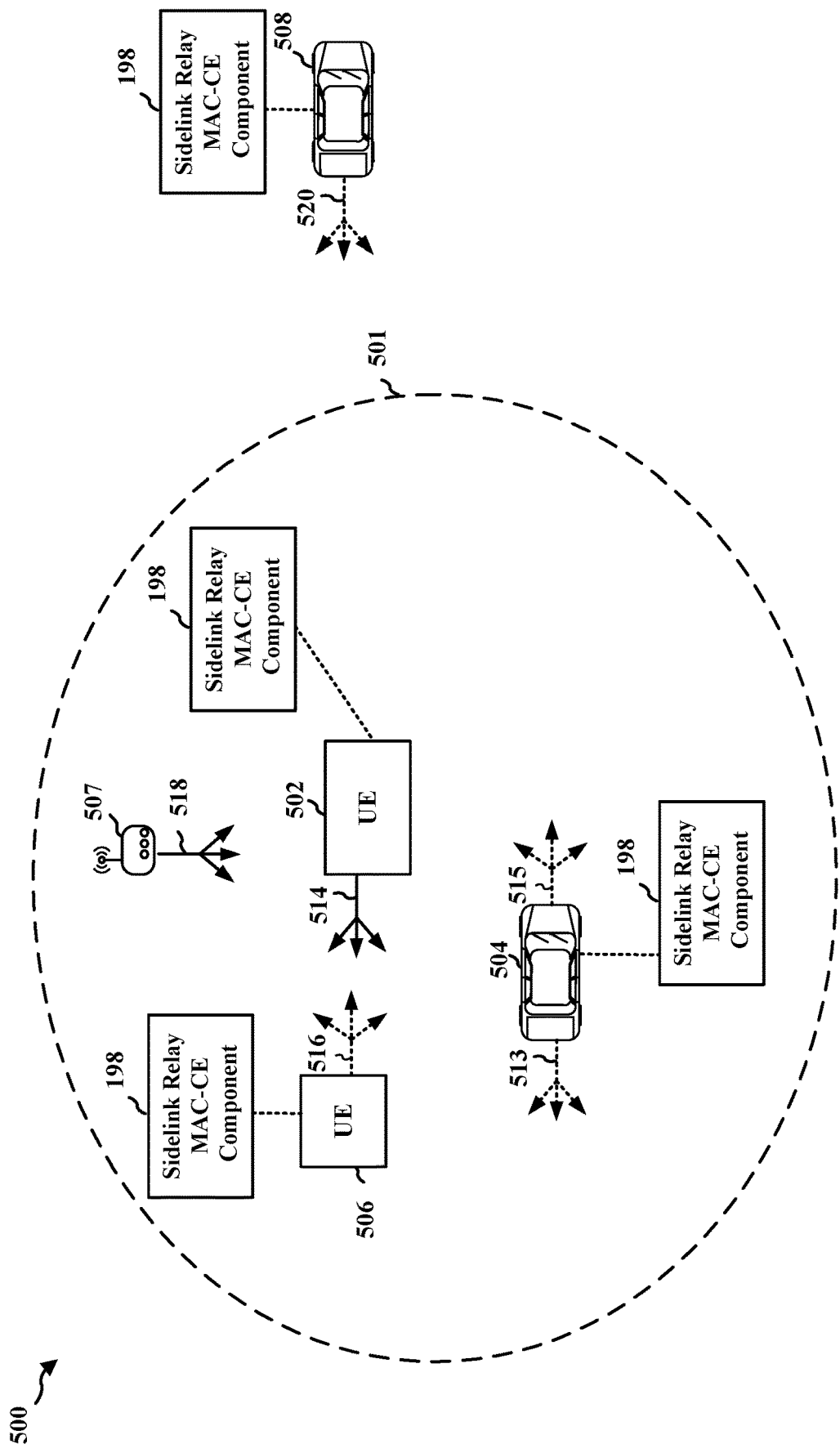
FIG. 5 illustrates example aspects of sidelink communication between devices, in accordance with aspects presented herein.

FIG. 5 illustrates an example 500 of sidelink communication between devices. The communication may be based on a slot structure including aspects described in connection with FIG. 4. For example, the UE 502 may transmit a sidelink transmission 514, e.g., including a control channel (e.g., a PSCCH) and/or a corresponding data channel (e.g., a PSSCH), that may be received by UEs 504, 506, 508. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 502, 504, 506, 508 may each be capable of sidelink transmission in addition to sidelink reception. Thus, UEs 504, 506, 508 are illustrated as transmitting sidelink transmissions 513, 515, 516, 520. The sidelink transmissions 513, 514, 515, 516, 520 may be unicast, broadcast, or multicast to nearby devices. For example, UE 504 may transmit sidelink transmissions 513, 515 intended for receipt by other UEs within a range 501 of UE 504, and UE 506 may transmit sidelink transmission 516. Additionally or alternatively, RSU 507 may receive communication from and/or transmit communication 518 to UEs 502, 504, 506, 508. One or more of the UEs 502, 504, 506, 508 or the RSU 507 may include the sidelink relay MAC-CE component 198 as described in connection with FIG. 1.

The MAC-CE is a command from one network device to another network device. The network device may be UEs and base station. Accordingly, the UE and the base station may send command messages in MAC-CE to the UE and/or the base station. Particularly, the MAC-CEs between UEs may be transmitted through a sidelink communication. The MAC-CE may provide feedback through HARQ messaging, which may provide improved reliability and increased latency. The receiver may provide HARQ ACK to the transmitter to provide confirmation that the command has been successfully received through the MAC-CE. Alternatively, the command messages may be transmitted via DCI on DL or UCI (over a PUCCH or a PUSCH) on UL. Transmitting the command messages via DCI on DL or UCI on UL does not provide HARQ messaging (e.g., ACK/negative ACK (NACK)). Therefore, the command messages transmitted via DCI on DL or UCI on UL may have lower latency, but may be less reliable.

The MAC-CE may be transmitted over sidelink communication. In LTE communication, a sidelink (SL) buffer status report (BSR) MAC-CE (SL-BSR MAC-CE) may be transmitted on a Uu link to indicate buffer-status of the sidelink traffic. For NR vehicle-to-everything (V2X) (NRV2X), a CSI report may be agreed to be transmitted over a sidelink MAC-CE. By transmitting the sidelink MAC-CE including the CSI report, a UE may not implement a receiver for UCI multiplexing.

To implement more advanced use cases, more sidelink-related MAC-CEs may be needed. For example, the MAC-CEs transmitted over either the Uu link or the sidelink communication may carry sidelink-related information. In the case of sidelink relaying, the MAC-CEs may indicate the relayed traffic and/or the originating traffic. In the case of the Uu-PC5 slot-aggregation, special handling may be provided for the MAC-CE, and the MAC-CE may indicate which code block groups (CBGs) was transmitted through which link.

The Uu link MAC-CEs (DL or UL) relayed via the sidelink communication may include appended relaying/routing information. The relaying/routing information may be separately indicated for RRC/MAC-CE/DCI or their sidelink equivalents. The replaying information may include one or more of a source node, a destination node, or a transit route.

In case the last leg of a relay is the Uu link, the routing information may be removed, or some or all of it may be kept (e.g., a source ID) at the last leg. In case of Uu+PC5 slot-aggregation, the last leg may be the Uu+PC5 link, and the routing information indication may be different compared to the Uu-only link.

The contents of the MAC-CE may include commands to a target network device (e.g., a receiving UE) to perform or activate a certain function. The MAC-CEs transmitted on the SL may include SL-related content such as SL-CSI, SL timing advance (SL-TA) (e.g., for out-of-coverage (OOC)), SL transmit power control (TPC) (SL-TPC), SL scheduling request (SR)/buffer status report (BSR)/power headroom report (PHR), activation/deactivation of SL semi-persistent scheduling (SL-SPS)/carrier grade (CG) and/or aperiodic/semi-persistent (A/SP) SL-CSI-RS/SRS (A/SP SL-CSI-RS/SRS). When the MAC-CEs including the above provided content are relayed over SL, the routing information may be padded/removed as proffered regarding the SL-relayed Uu MAC-CE.

The MAC-CEs sent on Uu link with SL-related content (e.g., SL-BSR of LTE) may include the SL-PHR, the TPC, a recommended bit-rate, channel busy ratio (CBR)/channel occupation ratio (CR), and the base station-relayed MAC-CEs as proffered regarding the MAC-CEs transmitted on the SL with SL-related content.

A 'header' MAC-CE may indicate which CBGs are transmitted through which link (the Uu link or the PC5 link). The header MAC-CE may also indicate locations of other MAC-CEs, particularly, whether they come from the Uu link or the PC5 link.

The MAC-CE may have an activation time. On the Uu link, some of the MAC-CEs such as the UL MAC-CEs, DL TA and a recommended bit rate may not have the activation time, but many MAC-CEs may have the activation time based on the time of the ACK transmission. For example, an activation time may be three ms or N slots after the transmission of an ACK. The counting of time may either include or exclude TA commands received during the counting. The ACK Tx may refer to an ACK for the entire TB. In general, UL MAC-CEs may not have an activation time, as how to react to the UL MAC-CE may be determined by the base station implementation.

On the SL communication, the MAC-CEs sent to the base station with the SL-related content may be treated like the Uu UL MAC-CEs, and it may be determined by the base station implementation to determine how to react to the MAC-CEs. The MAC-CEs sent to a UE over SL or over DL (with SL-related content) may be treated like Uu DL MAC-CEs. Accordingly, the activation time may be based on an ACK. The activation time may be different for the MAC-CEs sent over the SL and the MAC-CE sent over the DL. Furthermore, MAC-CEs relayed to the UE through relaying UE may need special consideration.

The MAC-CEs may be relayed to a receiving UE through the relaying UE, and different activation time may be configured for the receiving UE. The ACK may be transmitted in response to successfully receiving the MAC-CE. In case the ACK is not relayed, the ACK may be directly transmitted from the receiving UE to the originating UE, the UE from which the MAC-CE originated. The receiving UE may follow ACK timing, and may have the activation time based on the time of the ACK transmission. For example, the receiving UE may wait three ms after transmitting the ACK to the originating UE before activating the MAC-CE.

In case the ACK is relayed back to the originating UE through the relaying UE, the receiving UE may follow a timing dependent on the time delay caused by the hopping of the relayed MAC-CE, since a predetermined time delay may not be sufficient compared to the directly transmitted ACK. For example, the receiving UE may use X ms for an activation time, where X depends on a number of hops. Since the number of hops may be dynamic and the receiving UE may not know the number of signal hops, this information may be separately indicated to the receiving UE (e.g., as a part of the ACK or in DCI/MAC-CE/RRC). For example, the receiving UE may use an 'expected' number of hops instead as preconfigured.

In another example, the receiving UE may follow the timing of the last hop of an ACK. The receiving UE may know the timing based on when it receives the ACK. However, the originating UE may not know this time. Again, the receiving UE may use a preconfigured/expected timing which is based on the number of the hops, and the preconfigured/expected timing may become equivalent to the option of configuring the X ms of activation time. When the ACK may be relayed by multiple routes, the number of hops to determine the 'X ms' may be based on the shortest route or the longest route, where the length of the route refers to the number of hops.

When an originating UE transmits a MAC-CE including a command to a receiving UE via a relay UE, the receiving UE may determine an activation time to activate the command received in the MAC-CE from the originating UE via the relay UE.

In one example, when the receiving UE sends the ACK straight back to the originating UE, the receiving UE may follow the approach proffered regarding the Uu link. In one example, when the receiving UE sends an ACK relayed via the relay UE to the originating UE, the receiving UE may determine the activation time. First, the receiving UE may wait for an activation time period of X milliseconds corresponding to the hops between the receiving UE and the originating UE. Second, the receiving UE may increase the activation time period by adding an additional offset of Y milliseconds configured to allow time to relay ACK from the relay UE to the originating UE. Third, when the ACK to the originating UE itself is sent in a packet (e.g., a PSSCH carrying a second MAC-CE), the second MAC-CE may also be ACKed (e.g., the relay UE may send an ACK to the receiving UE to indicate the receipt of the second MAC-CE), and further the relay UE may send an ACK to the receiving UE to indicate the successful relaying of the second MAC-CE to the originating UE. Fourth, the MAC-CE from the originating UE may be activated after X' milliseconds after the transmission of a PSSCH carrying the MAC-CE based ACK (for the MAC-CE received from the originating UE) by the receiving UE. Fifth, the MAC-CE from the originating UE may be activated after X" milliseconds after the successful receipt of a HARQ-ACK for the successful transmission of the PSSCH transmitted to the originating UE.

Figure 6:
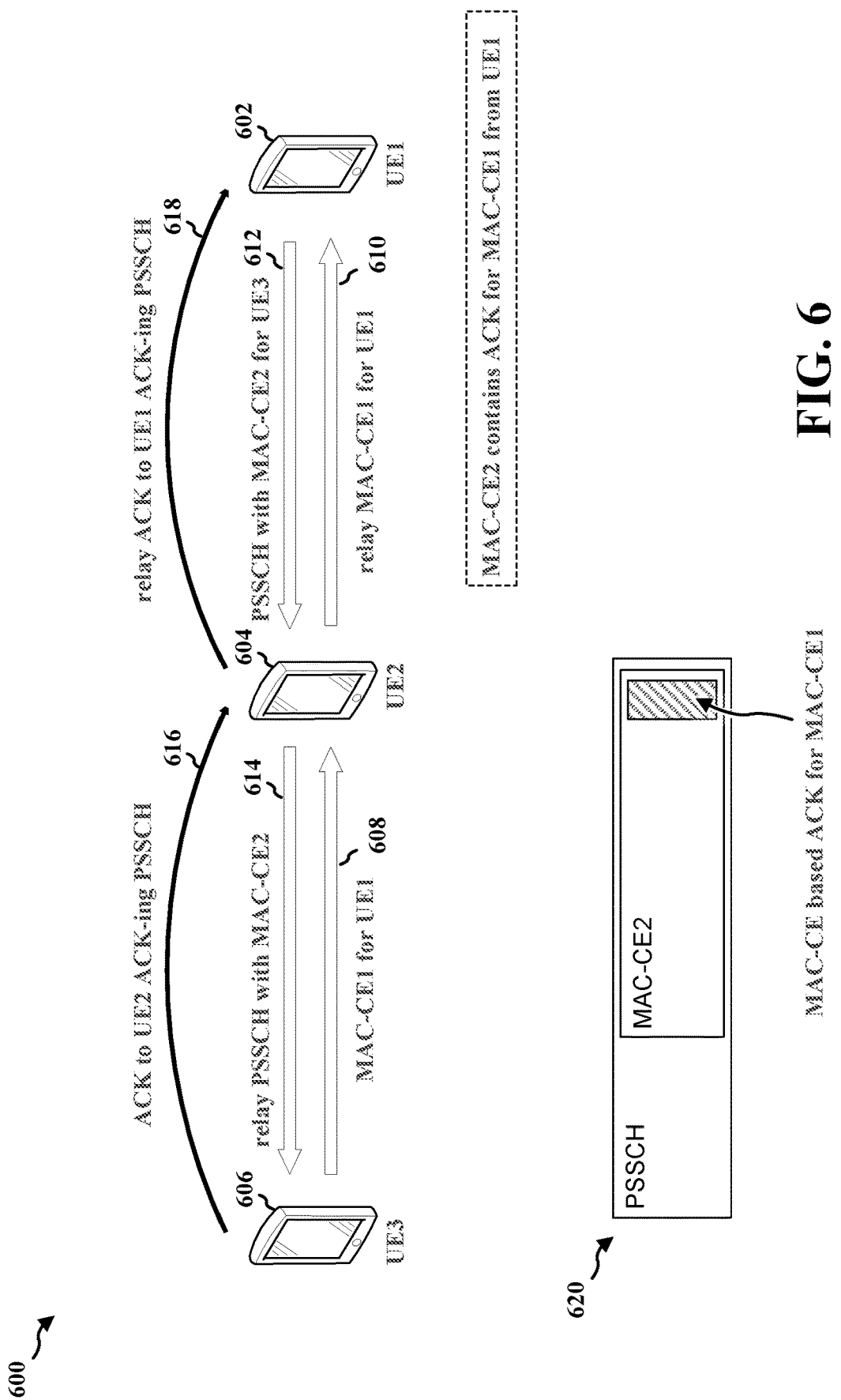
FIG. 6 illustrates an example of a wireless communication.

FIG. 6 illustrates an example 600 of a wireless communication. The example 600 includes a first UE 602, a second UE 604, and a third UE 606. The third UE 606 (or UE3) may transmit a MAC-CE to a first UE 602 (or UE1) using a second UE 604 (or UE2) as a relay UE. The MAC-CE from the third UE 606 may request the first UE 602 to transmit a response MAC-CE based ACK to the third UE 606, instead of or in addition to the HARQ ACK. The response MAC-CE transmitted by the first UE 602 to the third UE 606 need not be an ACK.

First, at 608, the third UE 606 may transmit a first MAC-CE (or a MAC-CE1) intended for the first UE 602 to the second UE 604. At 610, the second UE 604 in turn may relay the first MAC-CE to the first UE 602.

After successfully receiving the first MAC-CE from the third UE 606 via the second UE 604, the first UE 602 may transmit a PSSCH with a second MAC-CE (or a MAC-CE2) to the third UE 606 in response to the first MAC-CE. Here, the second MAC-CE may include the ACK for the first MAC-CE, indicating the successful reception of the first MAC-CE.

The PSSCH 620 illustrates an example of the PSSCH transmitted from the first UE 602 including the second MAC-CE, the second MAC-CE including the MAC-CE based ACK for the first MAC-CE, indicating the successful reception of the first MAC-CE.

At 612, the first UE 602 may transmit the PSSCH with the second MAC-CE to the third UE 606 by transmitting the PSSCH by relaying the second MAC-CE via the second UE 604. At 614, the second UE 604 may relay the PSSCH with the second MAC-CE to the third UE 606.

After successfully receiving the second MAC-CE from the first UE 602 via the second UE 604, the third UE 606 may transmit a HARQ ACK indicating the successful reception of the second MAC-CE. At 616, the third UE 606 may transmit the HARQ ACK indicating the successful reception of the second MAC-CE to the second UE 604. At 618, the second UE 604 may relay the HARQ ACK indicating the successful reception of the second MAC-CE to the first UE 602.

Figure 7:
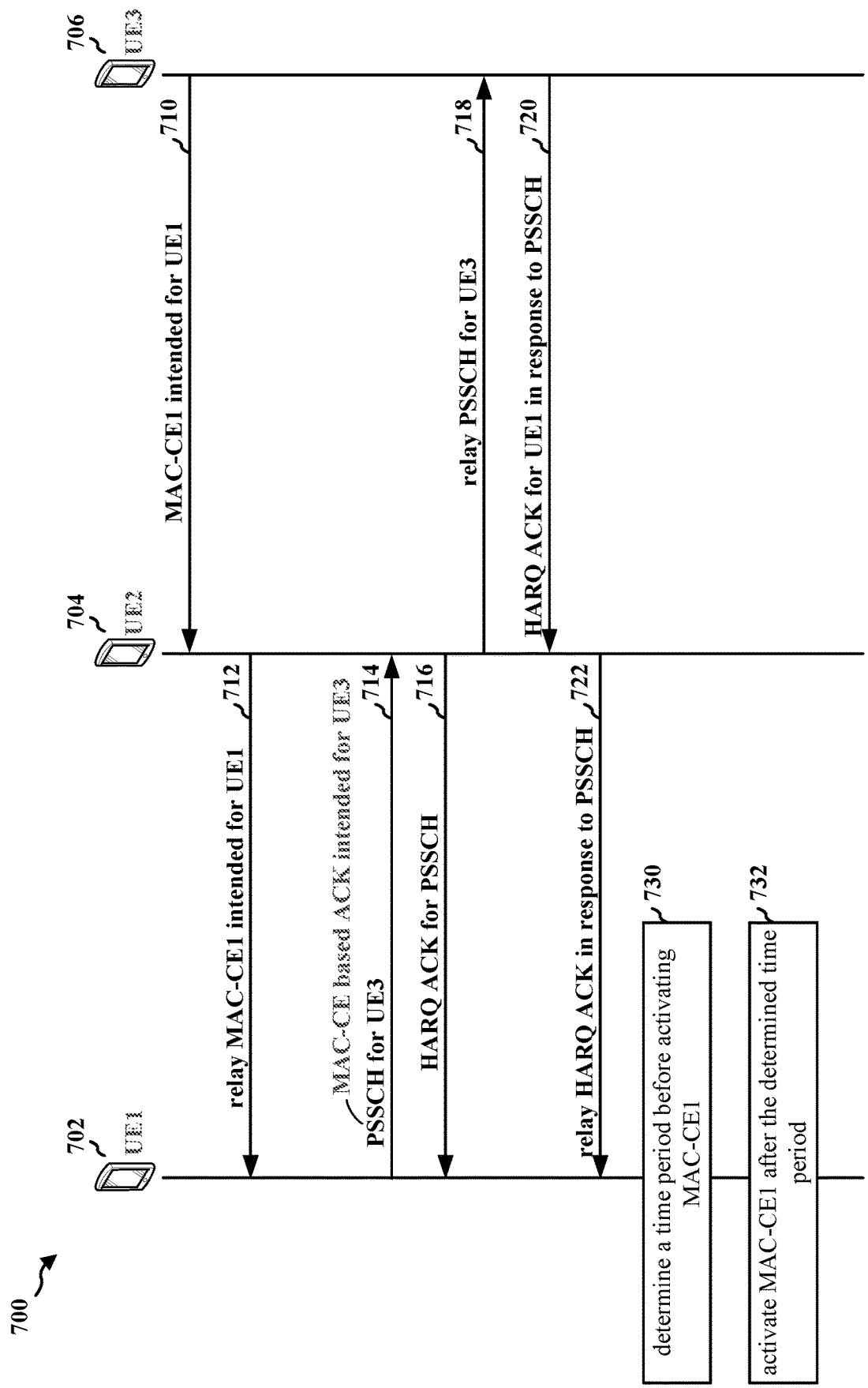
FIG. 7 is a call-flow diagram of wireless communication.

FIG. 7 is a call-flow diagram 700 of wireless communication. The call-flow diagram 700 may include a first UE 702, a second UE 704, and a third UE 706. The first UE 702 may receive an activation request from the third UE 706 relayed via the second UE 704, and transmit an activation response to the third UE 706 and activate the received activation request after a time period.

The third UE 706 (or UE3; e.g., first UE 602) may transmit a first MAC-CE (i.e., MAC-CE1) to the first UE 702 (or UE1; e.g., third UE 606) using the second UE 704 (or UE2; e.g., second UE 604) as a relay UE. The first MAC-CE from the third UE 706 may instruct the first UE 702 to transmit a MAC-CE based ACK to the third UE 706, instead of or in addition to the HARQ ACK. At 710, the third UE 706 may transmit, to the second UE 704, a first MAC-CE (or MAC-CE1) intended for the first UE 702 (e.g., at step 608). The first MAC-CE may include the activation request for a command associated with the first UE 702.

At 712, the second UE 704 may relay, from the third UE 706 to the first UE 702, the first MAC-CE including the activation request for a command associated with the first UE 702 (e.g., at step 610). The first UE 702 may receive the activation request for the command in association with the third UE 706, the activation request being received in the first MAC-CE relayed from the second UE 704 (e.g., at step 610). The activation request may be received through a PSSCH.

Upon successfully receiving the first MAC-CE from the third UE 706, at 714, the first UE 702 may transmit, to the second UE 704 and in response to the activation request, a second MAC-CE including an activation response to the third UE 706 (e.g., at step 612). The activation response may be transmitted through the PSSCH. The PSSCH may include a MAC-CE based ACK intended for the third UE 706 (e.g., the PSSCH 620). That is, the PSSCH transmitted from the first UE 702 may include the second MAC-CE including the MAC-CE based ACK for the first MAC-CE, indicating the successful reception of the first MAC-CE intended for the third UE 706.

At 716, the second UE 704 may transmit a HARQ ACK indicating the successful reception of the PSSCH from the first UE 702. The first UE 702 may receive a HARQ ACK in association with the second UE 704 from the second UE 704 in response to the activation response transmitted at 714.

At 718, the second UE 704 may relay, from the first UE 702 to the third UE 706, the second MAC-CE received at 714, the second MAC-CE including the activation response to the third UE 706 (e.g., at step 614).

Upon successfully receiving the PSSCH including the MAC-CE based ACK from the first UE 702 via the second UE 704, the third UE 706 may transmit a HARQ ACK indicating the successful reception of the PSSCH including the MAC-CE based ACK. At 720, the third UE 706 may transmit the HARQ ACK for the first UE 702 in response to the successful reception of the PSSCH from the first UE 702 relayed via the second UE 704 (e.g., at step 616).

At 722, the second UE 704 may relay, from the third UE 706 to the first UE 702, a HARQ ACK in association with the third UE 706 in response to the activation response (e.g., at step 618). The first UE 702 may receive the HARQ ACK in association with the third UE 706 from the second UE 704 in response to the activation response transmitted at 714 (e.g., at step 618).

At 730, the first UE 702 may determine a time period before activating the first MAC-CE received at 712. In one aspect, the first UE 702 may determine the time period to wait after receiving the HARQ ACK in association with the third UE 706 and before activating the command. In another aspect, the first UE 702 may determine the time period to wait after receiving the HARQ ACK in association with the second UE 704 and before activating the command. In another aspect, the first UE 702 may determine the time period after the transmission of the second MAC-CE including the activation response and before activating the command based on a number of hops between the third UE 706 and the first UE 702 through which the activation request traveled, the number of hops being greater than or equal to one.

In one aspect, the time period for the first UE 702 to wait before activating the first MAC-CE may be determined based on the transmission of the PSSCH for the third UE 706 at 714. That is, the first UE 702 may determine the time period as X milliseconds based on the number of hops from the first UE 702 to the third UE 706. The first UE 702 may activate the command transmitted in the first MAC-CE after the time period of X milliseconds after the transmission of the PSSCH containing the MAC-CE based ACK to the third UE 706 at 714.

In another aspect, the time period for the first UE 702 to wait before activating the first MAC-CE may be determined based on the reception of the HARQ ACK in response to the PSSCH, the HARQ ACK transmitted from the third UE 706 via the second UE 704 at 722. That is, the first UE 702 may determine the time period as Y milliseconds. The first UE 702 may activate the command transmitted in the first MAC-CE after the time period of Y milliseconds after the reception of the HARQ ACK from the third UE 706 via the second UE 704 at 722, the HARQ ACK indicating the successful reception of the PSSCH at the third UE 706.

In another aspect, the time period for the first UE 702 to wait before activating the first MAC-CE may be determined based on the reception of the HARQ ACK in response to the PSSCH, the HARQ ACK transmitted from the second UE 704 at 716. That is, the first UE 702 may determine the time period as Z milliseconds. The first UE 702 may activate the command transmitted in the first MAC-CE after the time period of Z milliseconds after the reception of the HARQ ACK from the second UE 704 at 716, the HARQ ACK indicating the successful reception of the PSSCH at the second UE 704.

At 732, the first UE 702 may activate the command after transmitting the activation response. That is, the first UE 702 may activate the first MAC-CE received from the third UE 706 at 712 after the time period determined at 730. In one aspect, the command may be activated after the time period from receiving the HARQ ACK in association with the third UE at 722. In another aspect, the command may be activated after the time period from receiving the HARQ ACK in association with the second UE at 716. In another aspect, the command may be activated after a time period from a transmission of the second MAC-CE including the activation response at 714. The command may be activated before the HARQ ACK is received, or the command may be activated after the HARQ ACK is received.

Figure 8:
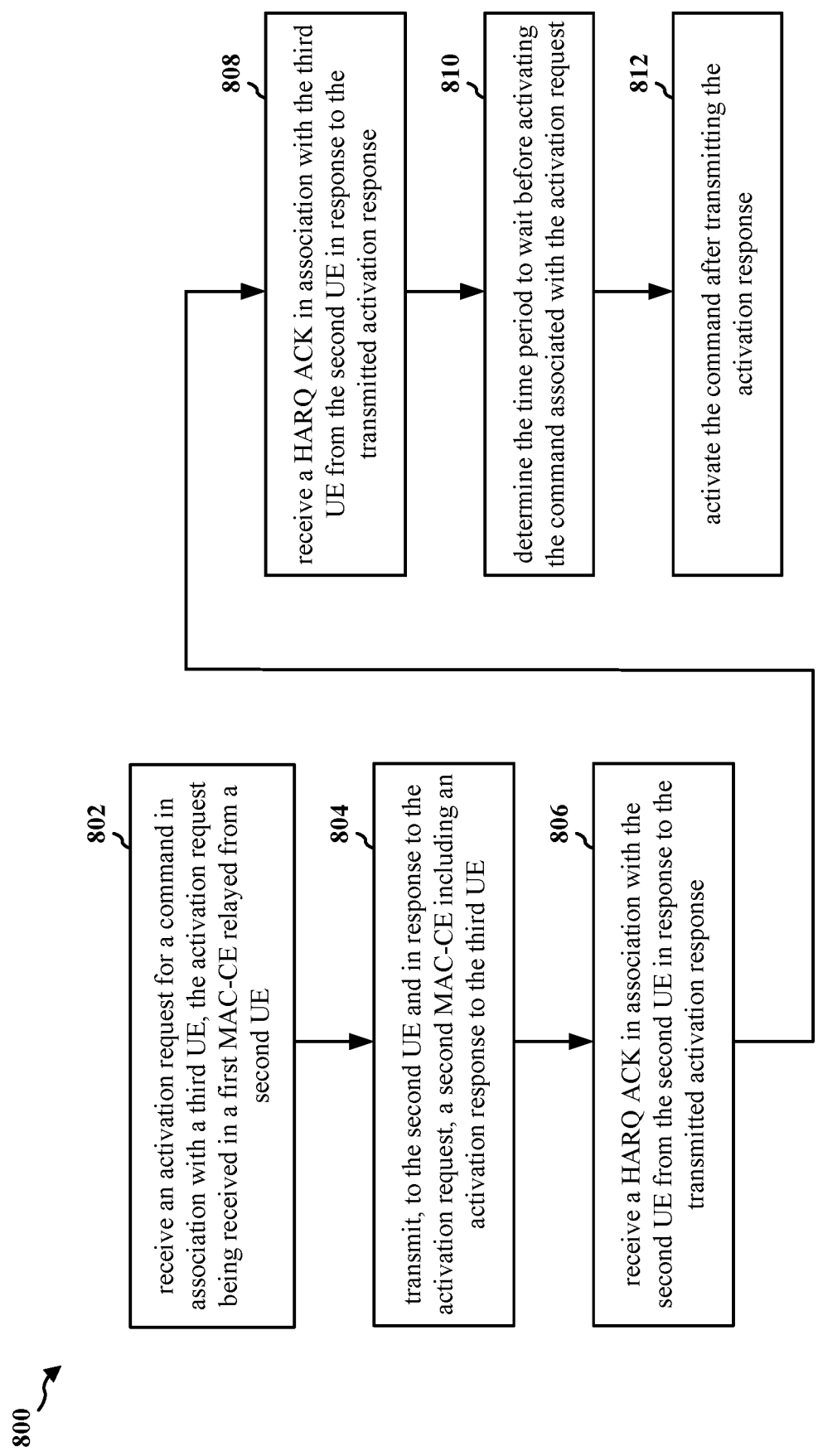
FIG. 8 is a flowchart of a method of wireless communication.

FIG. 8 is a flowchart 800 of a method of wireless communication. The method may be performed by a UE (e.g., the UE 104; the first UE 602/702; the apparatus 1202). The UE may receive an activation request from a third UE relayed via a second UE, and transmit an activation response to the third UE and activate the received activation request after a time period.

At 802, the UE may receive the activation request for the command in association with the third UE, the activation request being received in the first MAC-CE relayed from the second UE. The activation request may be received through a PSSCH. For example, at 712, the first UE 702 may receive the activation request for the command in association with the third UE 706, the activation request being received in the first MAC-CE relayed from the second UE 704. Furthermore, 802 may be performed by a MAC-CE managing component 1240.

At 804, the UE may, upon successfully receiving the first MAC-CE from the third UE at, transmit, to the second UE and in response to the activation request, a second MAC-CE including an activation response to the third UE. That is, the PSSCH transmitted from the UE may include the second MAC-CE including the MAC-CE based ACK for the first MAC-CE, indicating the successful reception of the first MAC-CE intended for the third UE. For example, at 714, the first UE 702 may, upon successfully receiving the first MAC-CE from the third UE at 802, transmit, to the second UE 704 and in response to the activation request, a second MAC-CE including an activation response to the third UE 706. Furthermore, 804 may be performed by the MAC-CE managing component 1240.

At 806, the UE may receive a HARQ ACK in association with the second UE from the second UE in response to the activation response transmitted at 804. For example, at 716, the first UE 702 may receive a HARQ ACK in association with the second UE 704 from the second UE 704 in response to the activation response transmitted at 714. Furthermore, 806 may be performed by a HARQ managing component 1242.

At 808, the UE may receive the HARQ ACK in association with the third UE from the second UE 704 in response to the activation response transmitted at 804. For example, at 722, the first UE 702 may receive the HARQ ACK in association with the third UE 706 from the second UE 704 in response to the activation response transmitted at 714. Furthermore, 808 may be performed by the HARQ managing component 1242.

At 810, the UE may determine a time period before activating the first MAC-CE received at 802. In one aspect, the UE may determine the time period to wait after receiving the HARQ ACK in association with the third UE and before activating the command. In another aspect, the UE may determine the time period to wait after receiving the HARQ ACK in association with the second UE and before activating the command. In another aspect, the UE may determine the time period after the transmission of the second MAC-CE including the activation response and before activating the command based on a number of hops between the third UE and the UE through which the activation request traveled, the number of hops being greater than or equal to one. For example, at 730, the first UE 702 may determine a time period before activating the first MAC-CE received at 802. Furthermore, 810 may be performed by an activation time period component 1244.

In one aspect, the time period for the UE to wait before activating the first MAC-CE may be determined based on the transmission of the PSSCH for the third UE at 804. That is, the UE may determine the time period as X milliseconds based on the number of hops from the UE to the third UE. The UE may activate the command transmitted in the first MAC-CE after the time period of X milliseconds after the transmission of the PSSCH containing the MAC-CE based ACK to the third UE at 804.

In another aspect, the time period for the UE to wait before activating the first MAC-CE may be determined based on the reception of the HARQ ACK in response to the PSSCH, the HARQ ACK transmitted from the third UE via the second UE at 808. That is, the UE may determine the time period as Y milliseconds. The UE may activate the command transmitted in the first MAC-CE after the time period of Y milliseconds after the reception of the HARQ ACK from the third UE via the second UE at 808, the HARQ ACK indicating the successful reception of the PSSCH at the third UE.

In another aspect, the time period for the UE to wait before activating the first MAC-CE may be determined based on the reception of the HARQ ACK in response to the PSSCH, the HARQ ACK transmitted from the second UE at 806. That is, the UE may determine the time period as Z milliseconds. The UE may activate the command transmitted in the first MAC-CE after the time period of Z milliseconds after the reception of the HARQ ACK from the second UE at 806, the HARQ ACK indicating the successful reception of the PSSCH at the second UE.

At 812, the UE may activate the command after transmitting the activation response. That is, the UE may activate the first MAC-CE received from the third UE at 802 after the time period determined at 810. In one aspect, the command may be activated after the time period from receiving the HARQ ACK in association with the third UE at 808. In another aspect, the command may be activated after the time period from receiving the HARQ ACK in association with the second UE at 806. In another aspect, the command may be activated after a time period from a transmission of the second MAC-CE including the activation response at 804. The command may be activated before the HARQ ACK is received, or the command may be activated after the HARQ ACK is received. For example, at 732, the first UE 702 may activate the command after transmitting the activation response. Furthermore, 812 may be performed by a command component 1246.

Figure 9:
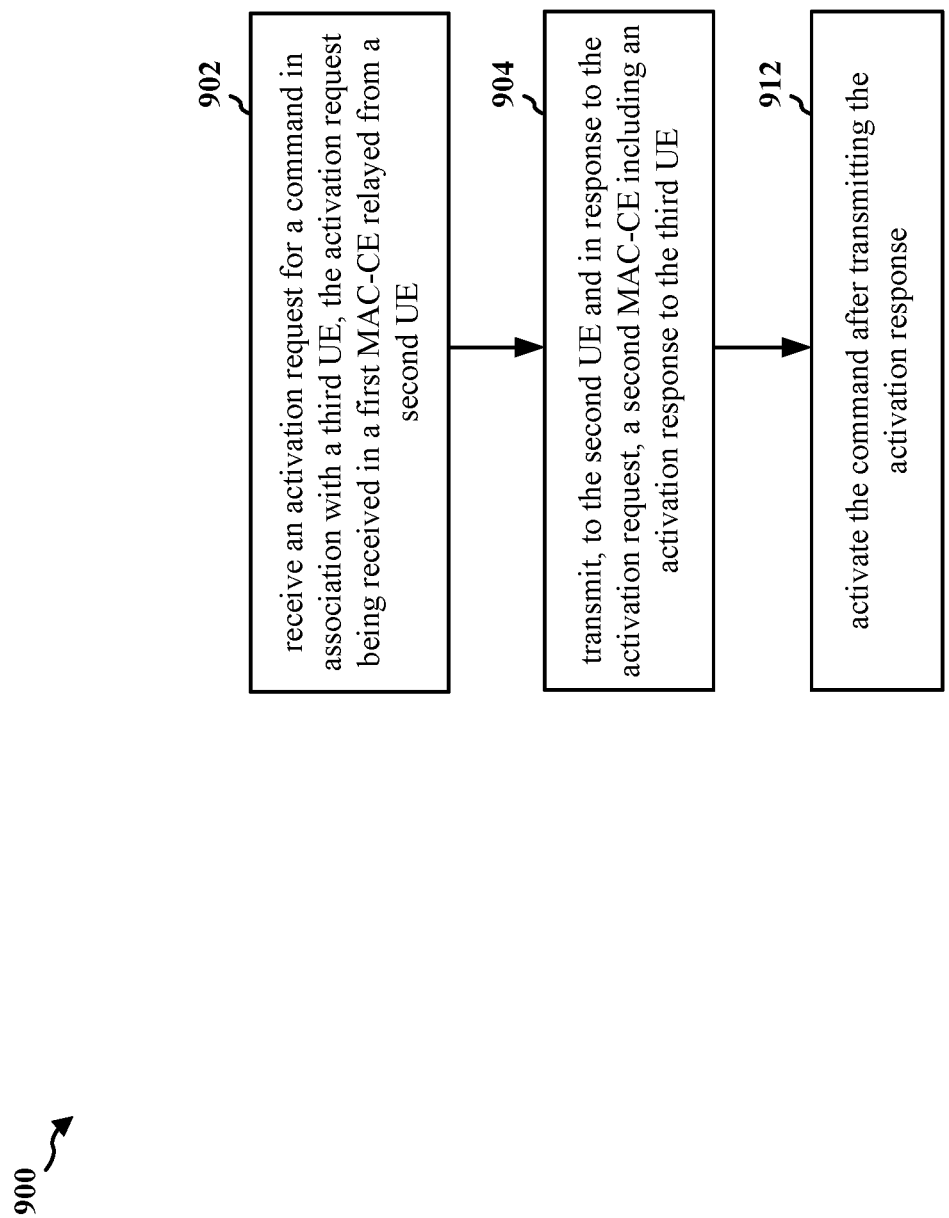
FIG. 9 is a flowchart of a method of wireless communication.

FIG. 9 is a flowchart 900 of a method of wireless communication. The method may be performed by a UE (e.g., the UE 104; the first UE 602/702; the apparatus 1202). The UE may receive an activation request from a third UE relayed via a second UE, and transmit an activation response to the third UE and activate the received activation request after a time period.

At 902, the UE may receive the activation request for the command in association with the third UE, the activation request being received in the first MAC-CE relayed from the second UE. The activation request may be received through a PSSCH. For example, at 712, the first UE 702 may receive the activation request for the command in association with the third UE 706, the activation request being received in the first MAC-CE relayed from the second UE 704. Furthermore, 902 may be performed by a MAC-CE managing component 1240.

At 904, the UE may, upon successfully receiving the first MAC-CE from the third UE at, transmit, to the second UE and in response to the activation request, a second MAC-CE including an activation response to the third UE. That is, the PSSCH transmitted from the UE may include the second MAC-CE including the MAC-CE based ACK for the first MAC-CE, indicating the successful reception of the first MAC-CE intended for the third UE. For example, at 714, the first UE 702 may, upon successfully receiving the first MAC-CE from the third UE at 902, transmit, to the second UE 704 and in response to the activation request, a second MAC-CE including an activation response to the third UE 706. Furthermore, 904 may be performed by the MAC-CE managing component 1240.

At 912, the UE may activate the command after transmitting the activation response. That is, the UE may activate the first MAC-CE received from the third UE at 902 after the time period determined. In one aspect, the command may be activated after the time period from receiving the HARQ ACK in association with the third UE. In another aspect, the command may be activated after the time period from receiving the HARQ ACK in association with the second UE. In another aspect, the command may be activated after a time period from a transmission of the second MAC-CE including the activation response at 904. The command may be activated before the HARQ ACK is received, or the command may be activated after the HARQ ACK is received. For example, at 732, the first UE 702 may activate the command after transmitting the activation response. Furthermore, 912 may be performed by a command component 1246.

Figure 10:
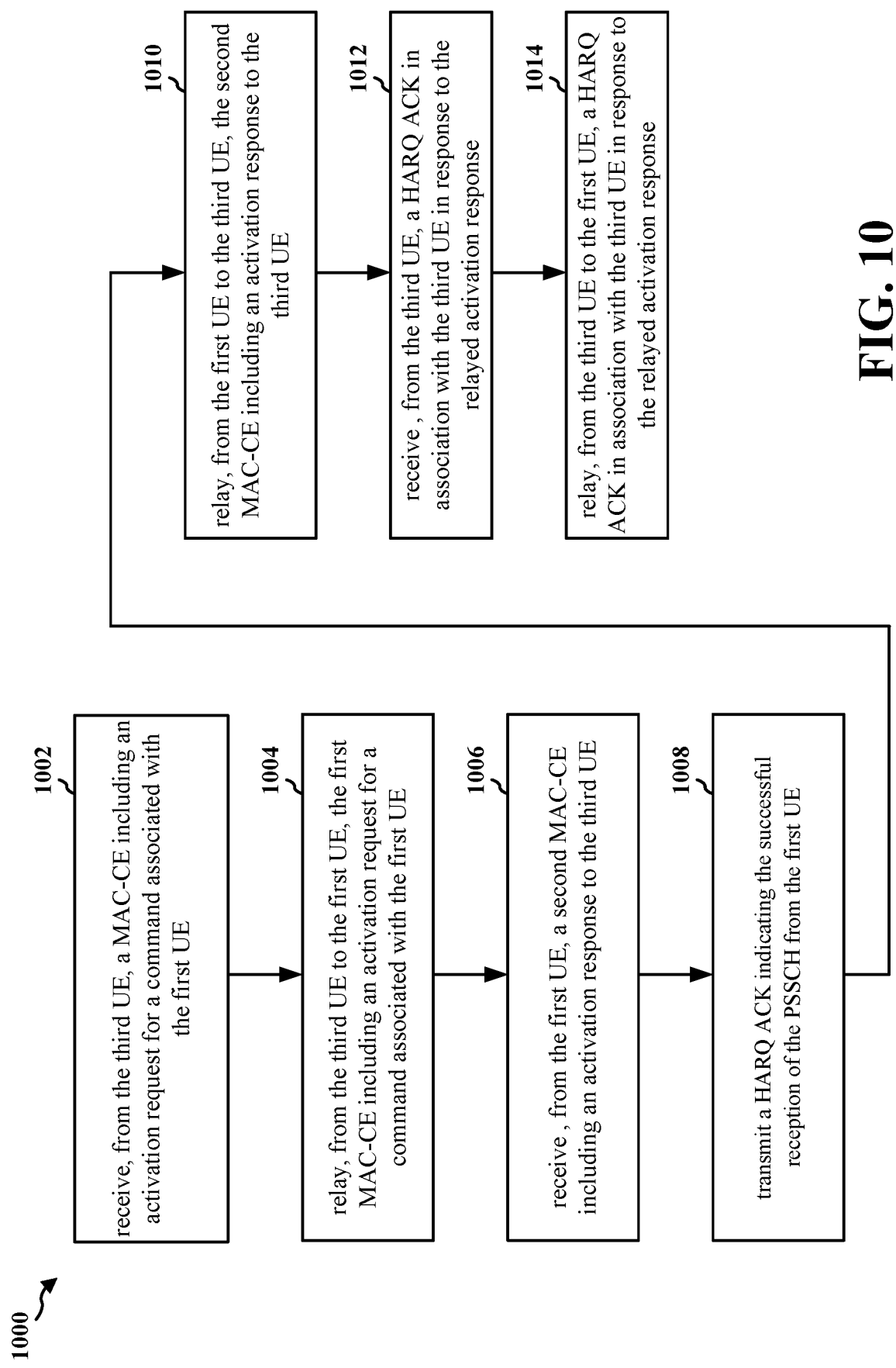
FIG. 10 is a flowchart of a method of wireless communication.

FIG. 10 is a flowchart 1000 of a method of wireless communication. The method may be performed by a UE (e.g., the UE 104; the second UE 604/704; the apparatus 1202). The UE may relay an activation request from a third UE to a first UE, and relay an activation response from the first UE to the third UE.

At 1002, the UE may receive, from the third UE, a first MAC-CE intended for the first UE. The first MAC-CE may include the activation request for a command associated with the first UE. For example, at 710, the second UE 704 may receive, from the third UE 706, a first MAC-CE intended for the first UE 702. Furthermore, 1002 may be performed by a MAC-CE managing component 1240.

At 1004, the UE may relay, from the third UE to the first UE, the first MAC-CE including the activation request for a command associated with the first UE. The activation request may be received through a PSSCH. For example, at 712, the second UE 704 may relay, from the third UE 706 to the first UE 702, the first MAC-CE including the activation request for a command associated with the first UE 702. Furthermore, 1004 may be performed by the MAC-CE managing component 1240.

At 1006, the UE may receive, from the first UE, a second MAC-CE including an activation response to the third UE. The activation response may be transmitted through the PSSCH. The PSSCH may include a MAC-CE based ACK intended for the third UE. That is, the PSSCH transmitted from the first UE may include the second MAC-CE including the MAC-CE based ACK for the first MAC-CE, indicating the successful reception of the first MAC-CE intended for the third UE. For example, at 714, the second UE 704 may receive, from the first UE 702, a second MAC-CE including an activation response to the third UE 706. Furthermore, 1006 may be performed by the MAC-CE managing component 1240.

At 1008, the UE may transmit a HARQ ACK indicating the successful reception of the PSSCH from the first UE. For example, at 716, the second UE 704 may transmit a HARQ ACK indicating the successful reception of the PSSCH from the first UE 702. Furthermore, 1008 may be performed by a HARQ managing component 1242.

At 1010, the UE may relay, from the first UE to the third UE, the second MAC-CE received at 1006, the second MAC-CE including the activation response to the third UE. For example, at 718, the second UE 704 may relay, from the first UE 702 to the third UE 706, the second MAC-CE received at 714, the second MAC-CE including the activation response to the third UE 706. Furthermore, 1010 may be performed by the MAC-CE managing component 1240.

At 1012, the UE may receive the HARQ ACK for the first UE in response to the successful reception of the PSSCH from the first UE relayed via the second UE. For example, at 720, the second UE 704 may receive the HARQ ACK for the first UE 702 in response to the successful reception of the PSSCH from the first UE 702 relayed via the second UE 704. Furthermore, 1012 may be performed by the HARQ managing component 1242.

At 1014, the UE may relay, from the third UE to the first UE, a HARQ ACK in association with the third UE in response to the activation response. For example, at 722, the second UE 704 may relay, from the third UE 706 to the first UE 702, a HARQ ACK in association with the third UE 706 in response to the activation response. Furthermore, 1014 may be performed by the HARQ managing component 1242.

Figure 11:
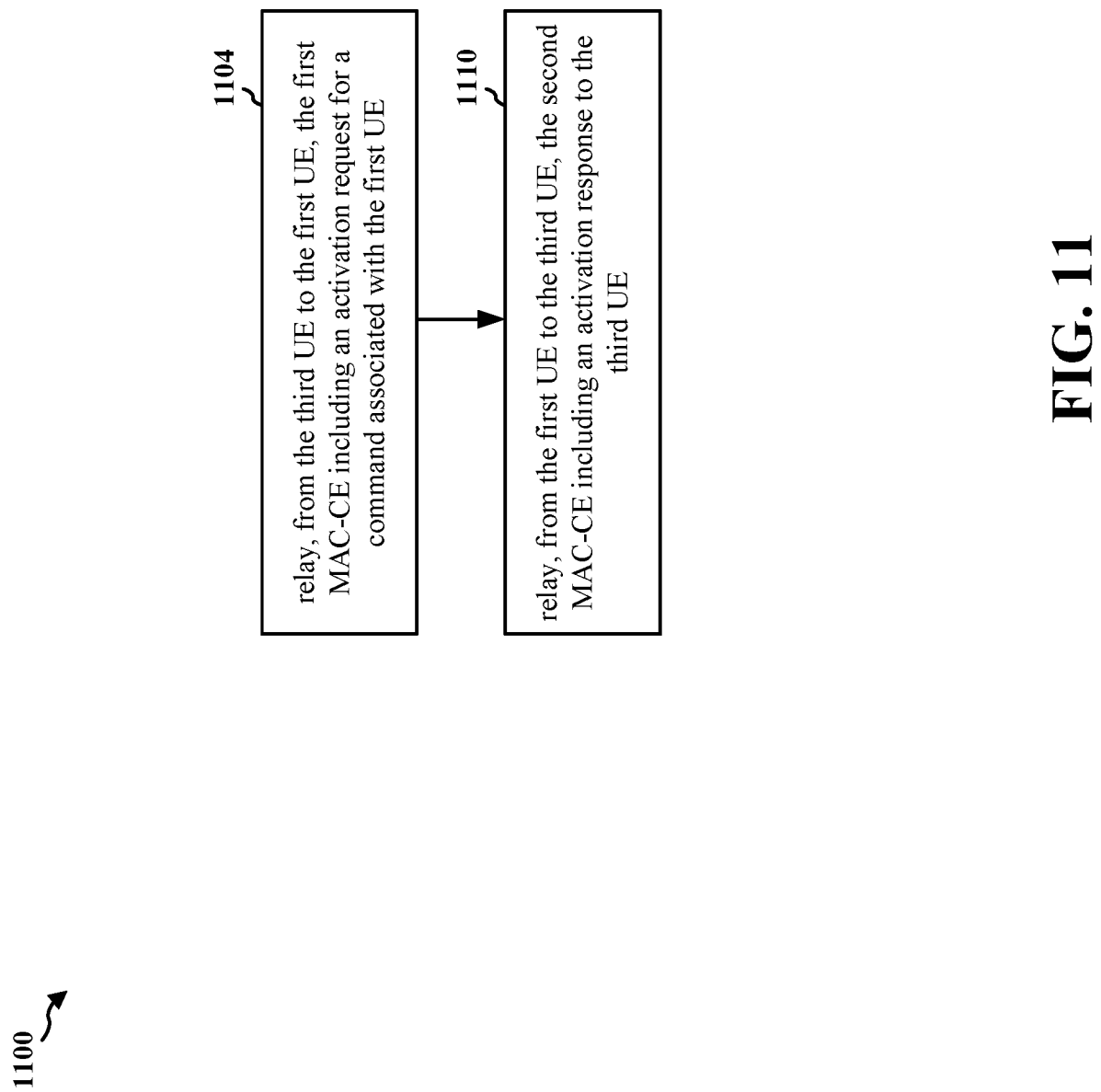
FIG. 11 is a flowchart of a method of wireless communication.

FIG. 11 is a flowchart 1100 of a method of wireless communication. The method may be performed by a UE (e.g., the UE 104; the second UE 604/704; the apparatus 1202). The UE may relay an activation request from a third UE to a first UE, and relay an activation response from the first UE to the third UE.

At 1104, the UE may relay, from the third UE to the first UE, the first MAC-CE including the activation request for a command associated with the first UE. The activation request may be received through a PSSCH. For example, at 712, the second UE 704 may relay, from the third UE 706 to the first UE 702, the first MAC-CE including the activation request for a command associated with the first UE 702. Furthermore, 1104 may be performed by the MAC-CE managing component 1240.

At 1110, the UE may relay, from the first UE to the third UE, the second MAC-CE received at 1106, the second MAC-CE including the activation response to the third UE. For example, at 718, the second UE 704 may relay, from the first UE 702 to the third UE 706, the second MAC-CE received at 714, the second MAC-CE including the activation response to the third UE 706. Furthermore, 1110 may be performed by the MAC-CE managing component 1240.

Figure 12:
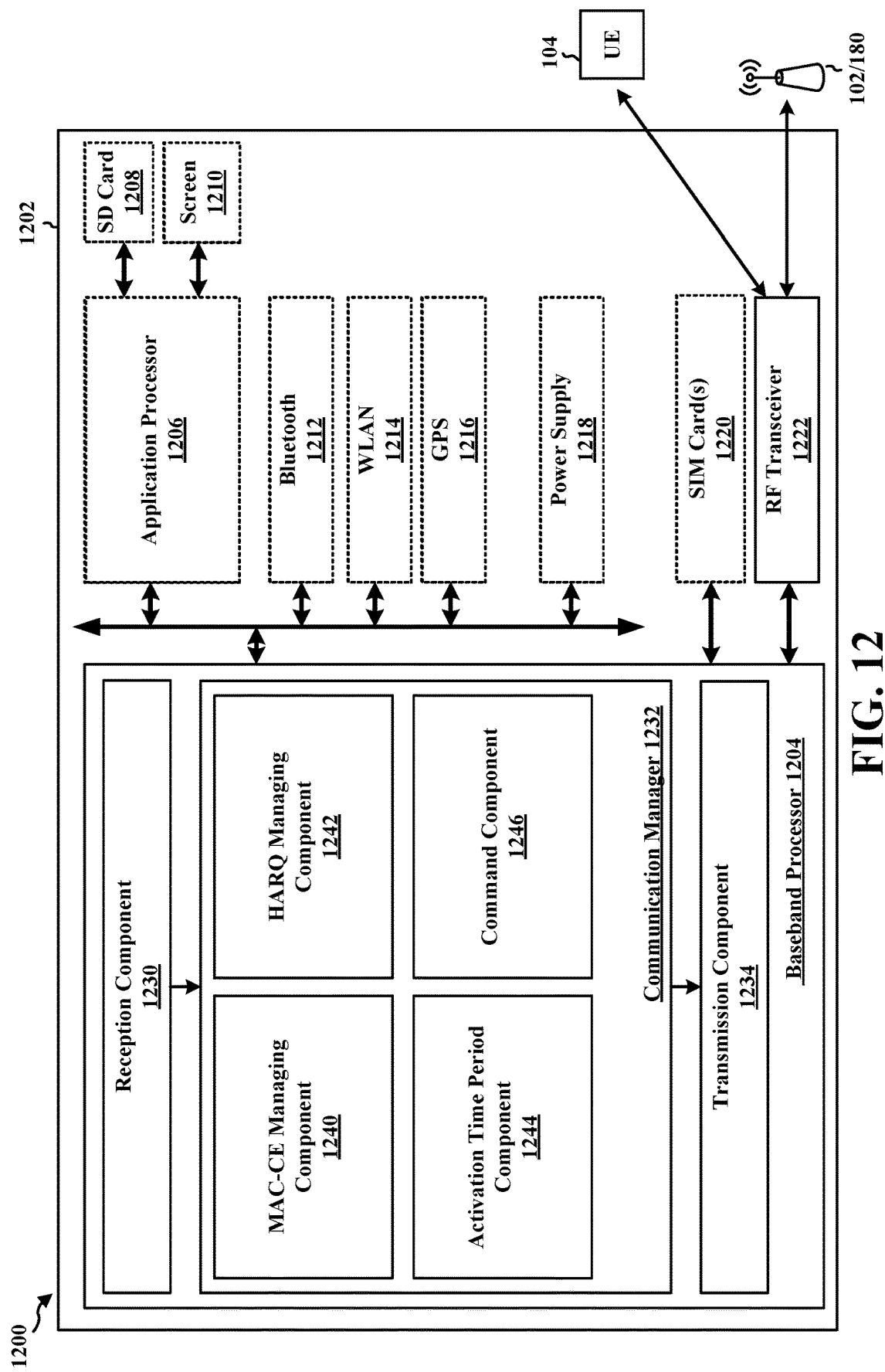
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, or another device configured to transmit and/or receive sidelink communication. The apparatus 1202 includes a baseband processor 1204 (also referred to as a modem) coupled to a RF transceiver 1222. In some aspects, the baseband processor 1204 may be a cellular baseband processor and/or the RF transceiver 1222 may be a cellular RF transceiver. The apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and/or a power supply 1218. The baseband processor 1204 communicates through the RF transceiver 1222 with the UE 104 and/or BS 102/180. The baseband processor 1204 may include a computer-readable medium/memory. The computer-readable medium/memory may be non-transitory. The baseband processor 1204 is responsible for general processing, including the execution of software stored on the computer-readable medium/memory. The software, when executed by the baseband processor 1204, causes the baseband processor 1204 to perform the various functions described in the present application. The computer-readable medium/memory may also be used for storing data that is manipulated by the baseband processor 1204 when executing software. The baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the baseband processor 1204. The baseband processor 1204 may be a component of the device 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a MAC-CE managing component 1240 that is configured to receive the activation request for the command in association with the third UE, transmit a second MAC-CE including an activation response to the third UE, receive, from the third UE, a first MAC-CE intended for the first UE, relay, from the third UE to the first UE, the first MAC-CE including the activation request for a command associated with the first UE, receive, from the first UE, a second MAC-CE including an activation response to the third UE, and relay, from the first UE to the third UE the second MAC-CE including the activation response to the third UE, e.g., as described in connection with 802, 804, 902, 904, 1002, 1004, 1006, 1010, 1104, and 1110. The communication manager 1232 further includes a HARQ managing component 1242 that is configured to receive a HARQ ACK in association with the second UE from the second UE in response to the activation response, receive the HARQ ACK in association with the third UE from the second UE in response to the activation response transmitted, transmit a HARQ ACK indicating the successful reception of the PSSCH from the first UE, receive the HARQ ACK for the first UE in response to the successful reception of the PSSCH from the first UE relayed via the second UE, and relay a HARQ ACK in association with the third UE in response to the activation response, e.g., as described in connection with 806, 808, 1008, 1012, 1014. The communication manager 1232 further includes an activation time period component 1244 that is configured to determine a time period before activating the first MAC-CE received, e.g., as described in connection with 810. The communication manager 1232 further includes a command component 1246 that is configured to activate the command after transmitting the activation response, e.g., as described in connection with 812 and 912.

The apparatus may include additional components that perform each of the blocks of the algorithm in the flowcharts of FIGS. 7, 8, 9, 10, and 11. As such, each block in the flowcharts of FIGS. 7, 8, 9, 10, and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the baseband processor 1204, includes means for receiving an activation request for a command in association with a third UE, the activation request being received in a first MAC-CE) relayed from a second UE, means for transmitting, to the second UE and in response to the activation request, a second MAC-CE including an activation response to the third UE, and means for activating the command after transmitting the activation response. The apparatus 1202 includes means for receiving a HARQ acknowledgment (ACK) in association with the third UE from the second UE in response to the transmitted activation response, and means for determining the time period to wait after receiving the HARQ ACK in association with the third UE and before activating the command, means for receiving a HARQ acknowledgment (ACK) in association with the second UE from the second UE in response to the transmitted activation response, and means for determining the time period to wait after receiving the HARQ ACK in association with the second UE and before activating the command. The apparatus 1202 includes means for determining the time period after the transmission of the second MAC-CE including the activation response and before activating the command based on a number of hops between the third UE and the first UE through which the activation request traveled, the number of hops being greater than or equal to one, and the apparatus 1202 includes means for receiving a HARQ acknowledgment (ACK) in association with the third UE from the second UE in response to the transmitted activation response. The apparatus 1202 includes means for relaying, from the third UE to the first UE, a first media access control (MAC) control element (CE) (MAC-CE) including an activation request for a command associated with the first UE, means for relaying, from the first UE to the third UE, a second MAC-CE including an activation response to the third UE, and means for relaying, from the third UE to the first UE, a HARQ ACK in association with the third UE in response to the relayed activation response. The means may be one or more of the components of the apparatus 1202 configured to perform the functions recited by the means. As described herein, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

The apparatus of wireless communication may include a UE configured to activate a MAC-CE transmitted over an SL relay after waiting a time period by receiving an activation request for a command in association with a second UE, the activation request being received in a first MAC-CE relayed from a third UE, transmitting, to the third UE and in response to the activation request, a second MAC-CE including an activation response to the second UE, and activating the command after transmitting the activation response. In one example, the UE may be further configured to receive an HARQ ACK in association with the second UE from the third UE in response to the transmitted activation response, wait a time period after receiving the HARQ ACK in association with the second UE and before activating the command, and determine the time period to wait after receiving the HARQ ACK in association with the second UE and before activating the command. In one example, the UE may receive the HARQ ACK in association with the third UE from the third UE in response to the transmitted activation response, wait a time period after receiving the HARQ ACK in association with the third UE and before activating the command, and determine the time period to wait after receiving the HARQ ACK in association with the third UE and before activating the command. In one example, the UE may wait a time period after transmission of the second MAC-CE including the activation response before activating the command, determine the time period to wait after the transmission of the second MAC-CE including the activation response and before activating the command based on a number of hops between the second UE and the first UE through which the activation request traveled, the number of hops being greater than or equal to one, and receive an HARQ ACK in association with the second UE from the third UE in response to the transmitted activation response. Here, the command may be activated either before or after receiving the HARQ ACK. Here, the activation request is received through a PSSCH, and the activation response is transmitted through the PSSCH. The UE may include an ACK in the activation response.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with aspects of other examples or teachings described herein, without limitation.

Aspect 1 is an apparatus for wireless communication at a first UE, including at least one processor coupled to a memory and configured to receive an activation request for a command in association with a third UE, the activation request being received in a first MAC-CE relayed from a second UE, transmit, to the second UE and in response to the activation request, a second MAC-CE including an activation response to the third UE, and activate the command after transmitting the activation response.

Aspect 2 is the apparatus of aspect 1, where the at least one processor and the memory are further configured to receive a HARQ ACK in association with the third UE from the second UE in response to the transmitted activation response.

Aspect 3 is the apparatus of aspect 2, where the command is activated after a time period from receiving the HARQ ACK in association with the third UE.

Aspect 4 is the apparatus of aspect 3, where the at least one processor and the memory are further configured to determine the time period to wait after receiving the HARQ ACK in association with the third UE and before activating the command.

Aspect 5 is the apparatus of aspect 1, where the at least one processor and the memory are further configured to receive a HARQ ACK in association with the second UE from the second UE in response to the transmitted activation response.

Aspect 6 is the apparatus of aspect 5, where the command is activated after a time period from receiving the HARQ ACK in association with the second UE.

Aspect 7 is the apparatus of aspect 6, where the at least one processor and the memory are further configured to determine the time period to wait after receiving the HARQ ACK in association with the second UE and before activating the command.

Aspect 8 is the apparatus of aspect 1, where the command is activated after a time period from a transmission of the second MAC-CE including the activation response.

Aspect 9 is the apparatus of aspect 8, where the at least one processor and the memory are further configured to determine the time period after the transmission of the second MAC-CE including the activation response and before activating the command based on a number of hops between the third UE and the first UE through which the activation request traveled, the number of hops being greater than or equal to one.

Aspect 10 is the apparatus of any of aspects 8 and 9, where the at least one processor and the memory are further configured to receive a HARQ ACK in association with the third UE from the second UE in response to the transmitted activation response.

Aspect 11 is the apparatus of aspect 10, where the command is activated before the HARQ ACK is received.

Aspect 12 is the apparatus of aspect 10, where the command is activated after the HARQ ACK is received.

Aspect 13 is the apparatus of any of aspects 1 to 12, where the activation request is received through a PSSCH, and the activation response is transmitted through the PSSCH.

Aspect 14 is the apparatus of any of aspects 1 to 13, further including a transceiver coupled to the at least one processor, where the activation response includes an ACK.

Aspect 15 is a method of wireless communication for implementing any of aspects 1 to 14.

Aspect 16 is an apparatus for wireless communication including means for implementing any of aspects 1 to 14.

Aspect 17 is a computer-readable medium storing computer executable code, where the code when executed by a processor causes the processor to implement any of aspects 1 to 14.

Aspect 18 is an apparatus for wireless communication including at least one processor coupled to a memory and configured to relay, from the third UE to the first UE, a first MAC-CE including an activation request for a command associated with the first UE, and relay, from the first UE to the third UE, a second MAC-CE including an activation response to the third UE.

Aspect 19 is the apparatus of aspect 18, where the at least one processor and the memory are further configured to relay, from the third UE to the first UE, a HARQ ACK in association with the third UE from the second UE in response to the relayed activation response.

Aspect 20 is the apparatus of any of aspects 18 and 19, where the activation request is received through a PSSCH, and the activation response is transmitted through the PSSCH.

Aspect 21 is the apparatus of any of aspects 18 to 20, further including a transceiver coupled to the at least one processor, where the activation response includes an ACK.

Aspect 22 is a method of wireless communication for implementing any of aspects 18 to 21.

Aspect 23 is an apparatus for wireless communication including means for implementing any of aspects 18 to 21.

Aspect 24 is a computer-readable medium storing computer executable code, where the code when executed by a processor causes the processor to implement any of aspects 18 to 21.

What is claimed is:

1. An apparatus for wireless communication at a first user equipment (UE), comprising:
    a memory; and
    at least one processor coupled to the memory, the at least one processor and the memory configured to:
        receive an activation request for a command in association with a third UE, the activation request being received in a first media access control (MAC) control element (CE) (MAC-CE) relayed from a second UE;
        transmit, to the second UE and in response to the activation request, a second MAC-CE including an activation response to the third UE; and
        activate the command after the transmission of the activation response and after a time period from the transmission of the second MAC-CE including the activation response, wherein the time period is based on a number of hops between the third UE and the first UE through which the activation request traveled.

2. The apparatus of claim 1, wherein the at least one processor and the memory are further configured to receive a hybrid automatic request (HARQ) acknowledgment (ACK) in association with the third UE from the second UE in response to the transmitted activation response.

3. The apparatus of claim 2, wherein to activate the command, the at least one processor and the memory are configured to activate the command after a time period from the reception of the HARQ ACK in association with the third UE.

4. The apparatus of claim 3, wherein the at least one processor and the memory are further configured to determine the time period to wait after the reception of the HARQ ACK in association with the third UE and before the activation of the command.

5. The apparatus of claim 1, wherein the at least one processor and the memory are further configured to receive a hybrid automatic request (HARQ) acknowledgment (ACK) in association with the second UE from the second UE in response to the transmitted activation response.

6. The apparatus of claim 5, wherein to activate the command, the at least one processor and the memory are configured to activate the command after a time period from the reception of the HARQ ACK in association with the second UE.

7. The apparatus of claim 6, wherein the at least one processor and the memory are further configured to determine the time period to wait after the reception of the HARQ ACK in association with the second UE and before activating the command.

8. The apparatus of claim 1, wherein the at least one processor and the memory are further configured to determine the time period after the transmission of the second MAC-CE including the activation response and before the activation of the command based on the number of hops between the third UE and the first UE through which the activation request traveled, the number of hops being greater than or equal to one.

9. The apparatus of claim 1, wherein the at least one processor and the memory are further configured to receive a hybrid automatic request (HARQ) acknowledgment (ACK) in association with the third UE from the second UE in response to the transmitted activation response.

10. The apparatus of claim 9, wherein to activate the command, the at least one processor and the memory are configured to activate the command before the reception of the HARQ ACK.

11. The apparatus of claim 9, wherein to activate the command, the at least one processor and the memory are configured to activate the command after the reception of the HARQ ACK.

12. The apparatus of claim 1, wherein to receive the activation request, the at least one processor and the memory are configured to receive the activation request through a physical sidelink shared channel (PSSCH), and wherein to transmit the activation response, the at least one processor and the memory are configured to transmit the activation response through the PSSCH.

13. The apparatus of claim 1, further comprising a transceiver coupled to the at least one processor, wherein activation response includes an acknowledgment (ACK).

14. A method for wireless communication at a first user equipment (UE), comprising:
    receiving an activation request for a command in association with a third UE, the activation request being received in a first media access control (MAC) control element (CE) (MAC-CE) relayed from a second UE;
    transmitting, to the second UE and in response to the activation request, a second MAC-CE including an activation response to the third UE; and
    activating the command after transmitting the activation response and after a time period from a transmission of the second MAC-CE including the activation response, wherein the time period is based on a number of hops between the third UE and the first UE through which the activation request traveled.

15. The method of claim 14, further comprising receiving a hybrid automatic request (HARQ) acknowledgment (ACK) in association with the third UE from the second UE in response to the transmitted activation response.

16. The method of claim 15, wherein the command is activated after a time period from receiving the HARQ ACK in association with the third UE.

17. The method of claim 16, further comprising determining the time period to wait after receiving the HARQ ACK in association with the third UE and before activating the command.

18. The method of claim 14, further comprising receiving a hybrid automatic request (HARQ) acknowledgment (ACK) in association with the second UE from the second UE in response to the transmitted activation response.

19. The method of claim 18, wherein the command is activated after a time period from receiving the HARQ ACK in association with the second UE.

20. The method of claim 19, further comprising determining the time period to wait after receiving the HARQ ACK in association with the second UE and before activating the command.

21. The method of claim 14, further comprising determining the time period after the transmission of the second MAC-CE including the activation response and before activating the command based on the number of hops between the third UE and the first UE through which the activation request traveled, the number of hops being greater than or equal to one.

22. The method of claim 14, further comprising receiving a hybrid automatic request (HARQ) acknowledgment (ACK) in association with the third UE from the second UE in response to the transmitted activation response.

23. The method of claim 22, wherein the command is activated before the HARQ ACK is received.

24. The method of claim 22, wherein the command is activated after the HARQ ACK is received.

25. The method of claim 14, wherein the activation request is received through a physical sidelink shared channel (PSSCH), and the activation response is transmitted through the PSSCH.

26. A non-transitory computer-readable medium storing computer executable code at a first user equipment (UE), the code when executed by at least one processor causes the at least one processor to:
  receive an activation request for a command in association with a third UE, the activation request being received in a first media access control (MAC) control element (CE) (MAC-CE) relayed from a second UE;
  transmit, to the second UE and in response to the activation request, a second MAC-CE including an activation response to the third UE; and
  activate the command after transmitting the activation response and after a time period from a transmission of the second MAC-CE including the activation response, wherein the time period is based on a number of hops between the third UE and the first UE through which the activation request traveled.

27. An apparatus for wireless communication at a first user equipment (UE), comprising:
  means for receiving an activation request for a command in association with a third UE, the activation request being received in a first media access control (MAC) control element (CE) (MAC-CE) relayed from a second UE;
  means for transmitting, to the second UE and in response to the activation request, a second MAC-CE including an activation response to the third UE; and
  means for activating the command after transmitting the activation response and after a time period from a transmission of the second MAC-CE including the activation response, wherein the time period is based on a number of hops between the third UE and the first UE through which the activation request traveled.

* * * * *